United States Patent
Nusier et al.

(10) Patent No.: US 9,862,421 B2
(45) Date of Patent: Jan. 9, 2018

(54) SLIDER BRACKET FOR A VEHICLE UNDERBODY STRUCTURE

(71) Applicant: Ford Global Technologies, LLC, Dearborn, MI (US)

(72) Inventors: Saied Nusier, Canton, MI (US); Mohamed Ridha Baccouche, Ann Arbor, MI (US); Saeed David Barbat, Novi, MI (US); Jamel E. Belwafa, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 38 days.

(21) Appl. No.: 15/133,900

(22) Filed: Apr. 20, 2016

(65) Prior Publication Data

US 2017/0305468 A1    Oct. 26, 2017

(51) Int. Cl.
  *B62D 21/15*    (2006.01)
  *B60R 19/24*    (2006.01)

(52) U.S. Cl.
  CPC ............ *B62D 21/155* (2013.01); *B60R 19/24* (2013.01)

(58) Field of Classification Search
  CPC ..... B62D 21/155; B62D 29/001; B62D 21/11
  USPC .................................................. 280/124.109
  See application file for complete search history.

(56) References Cited

U.S. PATENT DOCUMENTS

| 1,411,052 A | 3/1922 | McGowen | |
|---|---|---|---|
| 3,850,466 A | 11/1974 | Yepis | |
| 6,073,991 A * | 6/2000 | Naert | B60G 7/001 296/187.02 |
| 6,739,624 B2 * | 5/2004 | Barber | B62D 21/11 280/124.109 |
| 6,869,090 B2 * | 3/2005 | Tatsumi | B60G 3/20 280/124.109 |
| 7,883,113 B2 * | 2/2011 | Yatsuda | B62D 21/11 180/232 |
| 2006/0284446 A1 | 12/2006 | Fillon et al. | |
| 2016/0121932 A1 * | 5/2016 | Suzuki | B62D 21/152 296/187.09 |

(Continued)

FOREIGN PATENT DOCUMENTS

| EP | 1864866 A1 | 12/2007 |
|---|---|---|
| JP | 2015131545 A | 7/2015 |
| WO | 2015048057 A1 | 4/2015 |

OTHER PUBLICATIONS

Paul Du Bois, et al., Vehicle Crashworthiness and Occupant Protection, publication, 2004, 388 pages.

*Primary Examiner* — Faye M Fleming
(74) *Attorney, Agent, or Firm* — Jason Rogers; Brooks Kushman P.C.

(57) ABSTRACT

A vehicle includes a bumper, a floor and a subframe. The subframe is attached to the floor at a plurality of attachment points and below the bumper. The subframe has a base member extending across the subframe, parallel to the bumper and including a bracket. The bracket has first and second tabs connected by a platform extending from the first and second tabs. The bracket is fixedly attached at the second tab and angled relative to the base member such that the second tab is defined closer to the bumper. Upon loading, the first tab moves in a direction substantially parallel to the base member and the platform is deformed substantially perpendicular to the base member.

15 Claims, 2 Drawing Sheets

(56) References Cited

U.S. PATENT DOCUMENTS

2016/0152270 A1* 6/2016 Kondo .................. B62D 21/00
                                                    280/124.109

* cited by examiner

SLIDER BRACKET FOR A VEHICLE UNDERBODY STRUCTURE

TECHNICAL FIELD

The present disclosure relates to an energy absorbing bracket on a vehicle subframe.

BACKGROUND

Vehicle subframes may connect vehicle frames to vehicle floors. Typically, subframes define a rigid structure to provide added support between the frame and the floor. The subframe may support certain vehicle components such as the engine, drivetrain, or suspension. The subframe allows for the distribution of weight of the vehicle components across the vehicle. This allows for a reduction of the overall weight of the vehicle and, as such, improves fuel efficiency.

SUMMARY

A vehicle underbody structure includes a floor and a subframe. The subframe is connected to the floor and has a base extending a width of the subframe. The base includes a bracket attached offset from a center and substantially adjacent a side of the base. The bracket has a first and a second tab. The second tab is secured to the base, and the first tab is configured such that, upon impact, a platform connecting and extended from the first and second tabs is loaded substantially perpendicular to the base and the first tab is extended substantially parallel to the base.

A vehicle includes a bumper, a floor and a subframe. The subframe is attached to the floor at a plurality of attachment points and below the bumper. The subframe has a base member extending across the subframe, parallel to the bumper and including a bracket. The bracket has first and second tabs connected by a platform extending from the first and second tabs. The bracket is fixedly attached at the second tab and angled relative to the base member such that the second tab is defined closer to the bumper. Upon loading, the first tab moves in a direction substantially parallel to the base member and the platform is deformed substantially perpendicular to the base member.

A subframe for a vehicle includes a base member having a bracket attached at a first tab of the bracket. The bracket is disposed offset a center of the base member and further includes a second tab and a platform. The platform connects the first and second tabs and is oriented such that upon loading, the platform is loaded perpendicular to the base member and the first tab is loaded parallel to the base member.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
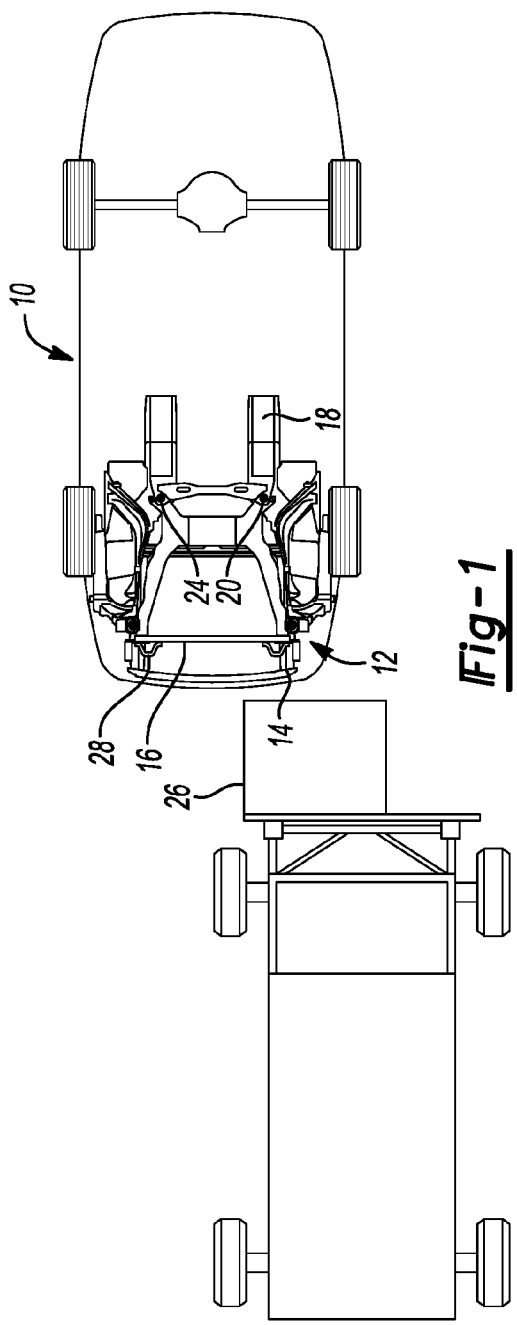
FIG. 1 is plan view of an underbody structure of a vehicle.

Referring to FIG. 1, a plan view of a vehicle 10 having an underbody structure 12 is shown. The underbody structure 12 includes a frame 14, a subframe 16, and a floor 18. The subframe 16 uses a rear end joint 20 to attach to the floor 18. The floor 18 attaches to the subframe 16 using a fastener 24. In at least one embodiment, the fastener 24 may be a bolt, screw, or shaft that allows for rigid attachment between the floor 18 and the subframe 16.

In the event of an impact with the vehicle 10, and specifically the underbody structure 12, various factors may further aid to improve performance of the underbody structure 12 and specifically the subframe 16. For example, as depicted in FIG. 1, a barrier 26 may be impacted by the vehicle 10. The barrier 26 may include, by way of example another vehicle, the rigid object, or any other object that may be impacted by the vehicle 10 and contacted by the underbody structure 12 in subframe 16. Important factors that may improve performance of the vehicle 10 and underbody structure 12 including the subframe 16 include, but are not limited to, energy absorption of the barrier 26, change in velocity of the barrier 26, the bottoming-up of the barrier 26, and homogeneity of the barrier 26 post impact.

The homogeneity of the barrier 26 post impact refers to deformation of the barrier 26 after impact with the vehicle 10 and specifically the underbody structure 12 including the subframe 16. Improving the homogeneity of the barrier 26 requires energy absorption from the subframe 16. Specifically, improving homogeneity of the barrier 26 requires elimination of a hard load imposed on the barrier by absorbing energy to create a soft load through a sliding bracket 28 attached to the subframe 16. As will be described in more detail below, the sliding bracket 28 is attached to the subframe 16 and configured to absorb energy upon impact with the barrier 26. Absorbing impact energy in the event of an impact with the barrier 26 allows the subframe 16 to absorb more of the energy load from the impact without providing further damage to either the subframe 16 or the barrier 26. Since the sliding bracket 28 is configured to absorb energy from the impact with the barrier 26, the total deformation of the barrier 26 will be more homogenized.

Further, the sliding bracket 28 also further aids to reduce the vehicle pulse index during an impact with the barrier 26. The vehicle pulse index may be defined by a crash pulse that acts on the vehicle 10 to affect an occupant's (not shown) movement within the vehicle 10. For example, the more energy absorbed by the underbody structure 12, and more specifically the subframe 16, the less force will be transferred to the vehicle 10 and the less an occupant will move within the vehicle 10. Therefore, attaching the sliding bracket 28 to the subframe 16 increases the crush space available on the underbody structure 12. Increasing the crush space by using the sliding bracket 28 allows for more energy absorption by the underbody structure 12 and subframe 16 and further aids to reduce the force exerted on the vehicle 10 and likewise the movement of occupant within the vehicle 10. The sliding bracket 28 reduces the crash pulse and, as such, the vehicle pulse index by increasing the crush space of the underbody structure 12.

Figure 2:
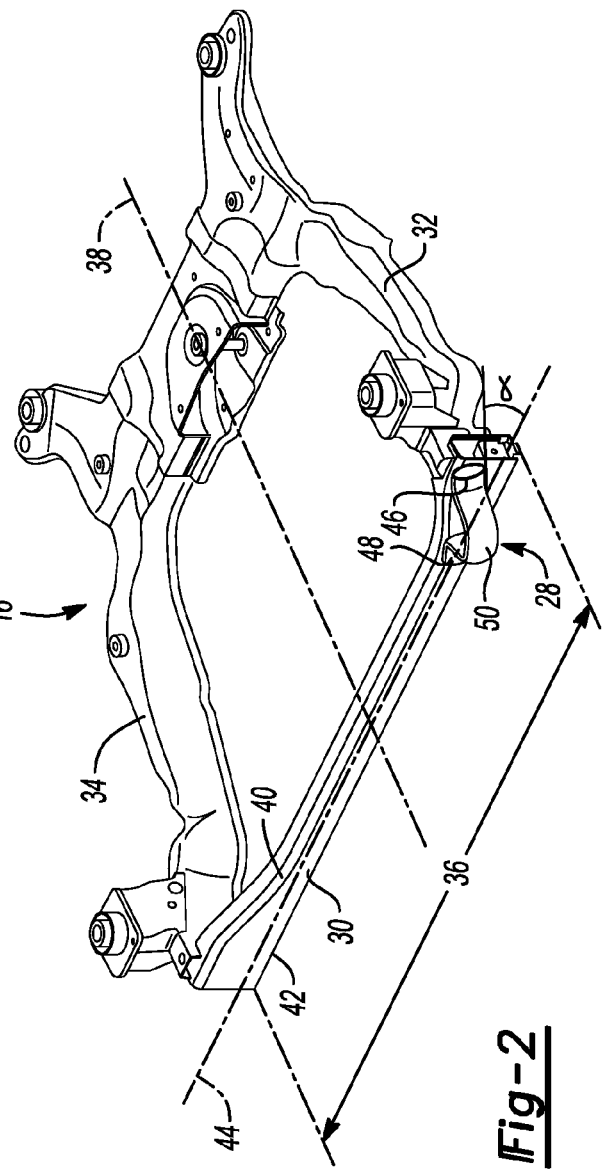
FIG. 2 is a perspective view of the subframe and bracket attached the base of the subframe.

Referring to FIG. 2, a perspective view of the subframe 16 with the sliding bracket 28 is depicted. The subframe 16 includes a base 30 that extends between a first side 32 and a second side 34 defining an entire width 36 of the subframe 16. Further, the subframe 16 defines a center 38 that is equal to a center 38 of the base 30. As can be seen in FIG. 2, the sliding bracket 28 is disposed on the base 30 offset from the center 38. The sliding bracket 28 is depicted in FIG. 2 as being disposed on the base 30 offset from the center 38 adjacent the first side 32. However, the sliding bracket 28 may also be disposed on the base 30 offset from the center 38 adjacent the second side 34. Likewise, the subframe 16 may also include a sliding bracket 28 disposed on the base 30 offset from the center 38 and adjacent the first and second sides 32, 34. The position of the sliding bracket 28 on the base 30 may also be optimized according to deformation homogeneity of the barrier 26 and the vehicle pulse index, as discussed above.

As can be seen in the depiction of FIG. 2, the sliding bracket 28 may be attached nonlinearly relative to the base 30. The base 30 includes a first edge 40 and a second edge 42 as well as a central horizontal axis 44. The first edge 40 and the second edge 42 extend in a horizontal direction parallel to the central horizontal axis 44 of the base 30. Therefore, the first and second edges 40, 42 extend from the first side 32 to the second side 34 of the subframe 16. The sliding bracket 28 attaches to the base 30 between the first edge 40 and the second edge 42. Further, the bracket 28 may be disposed on the base 30 at an angle $\alpha$ relative to the horizontal axis 44 of the base 30. In at least one other embodiment, the sliding bracket 28 may be disposed on the base 30 between the first and second edges 40, 42 such that the sliding bracket 28 is in line with the horizontal axis 44.

The angle $\alpha$ may be determined according to the necessary energy absorption to improve homogeneity and the vehicle pulse index. For example, the angle of the sliding bracket 28 shown in FIG. 2 represents a positive angle $\alpha$. In at least one other embodiment, the angle of the sliding bracket 28 may define a negative angle $\alpha$ relative to the horizontal axis 44. As stated above, the subframe 16 may include more than one sliding bracket 28 defined adjacent to both the first and second sides 32, 34. Each of sliding bracket on the first side 32 and the second side 34 may also define the same angle $\alpha$ relative to the horizontal axis 44. Likewise, each sliding bracket 28 on the first side 32 and the second side 34 may also define different angles $\alpha$ relative to the horizontal axis 44. Using differing angles between sliding brackets 28 defined adjacent to the first side 32 and the second side 34 allows the vehicle 10 to account for differing impact scenarios associated with each of the first and second sides 32, 34 of the subframe 16.

The sliding bracket 28 includes a first tab 46, a second tab 48, and a platform 50. The platform 50 extends above and connects the first and second tabs 46, 48. The second tab 48 is fixedly attached to the base 30. The first tab 46 is freely disposed on the base 30. The platform 50 is spaced from and parallel to the base 30. The angle $\alpha$ of the sliding bracket 28 may be defined as the angle between the first tab 46 and the horizontal axis 44 of the base 30. Therefore, in order to define a positive angle $\alpha$, the first tab 46 extends in a direction above the horizontal axis 44 toward the first edge 40. If a positive angle $\alpha$ is defined between the sliding bracket 28 and the horizontal axis 44 of the base 30, then the second tab 48 is fixedly attached to the base 30 below the horizontal axis 44. Likewise, in order to define a negative angle $\alpha$, the first tab 46 extends in a direction below the horizontal axis 44 toward the second edge 42. If a negative angle $\alpha$ is defined between the sliding bracket 28 and the horizontal axis 44 of the base 30, then the second tab 48 is fixedly attached to the base 30 above the horizontal axis 44. As stated above, the angle $\alpha$ may be optimized according to the crush requirements to absorb energy from an impact with the barrier 26.

The sliding bracket 28 may be mechanically fixed to the base 30. For example, the second tab 48 may be welded to the base 30. In at least one other embodiment, the second tab 48 may be fastened to the base using a fastener, rivet, or any other mechanical fastening device that will fixedly attach the second tab 48 to the base 30. As will be discussed in more detail below, fixedly attaching the second tab 48 to the base 30 allows the sliding bracket 28 to create more crush space on the underbody structure 12 and more specifically the subframe 16. In at least one other embodiment, the first tab 46 may be fixedly attached to the base 30 and the second tab 48 may be freely disposed on the base 30. If the first tab 46 is fixedly attached to the base 30, it may also be mechanically fastened to the base 30 such as through welding, riveting, or using a fastener.

Figure 3:
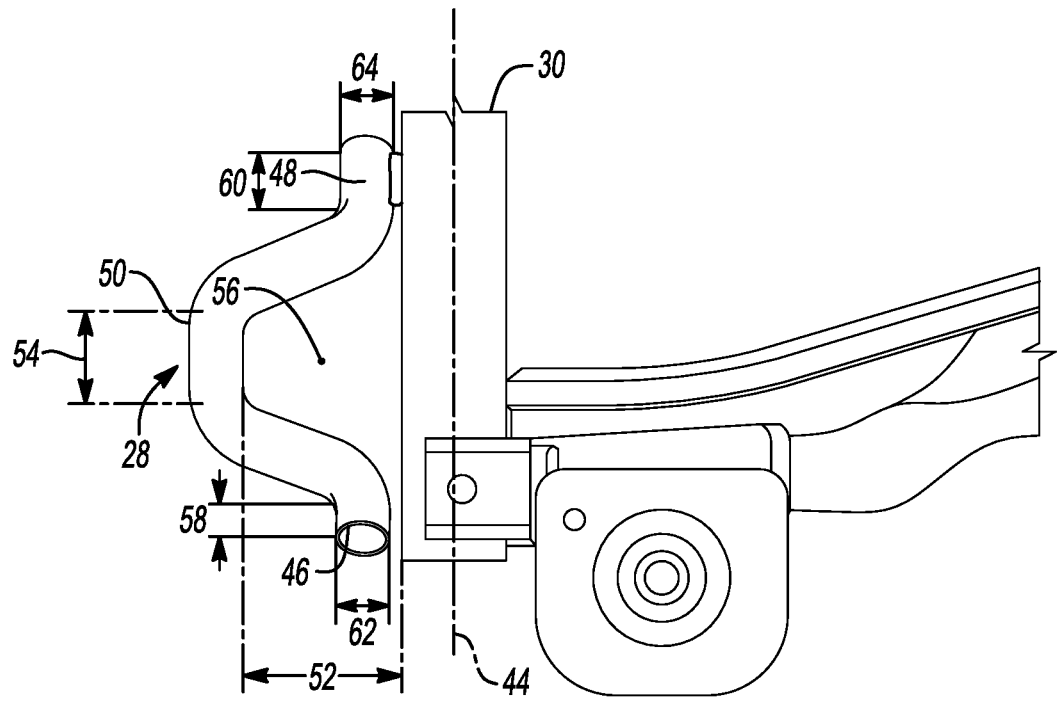
FIG. 3 is a top view of the bracket before an impact.
Figure 4:
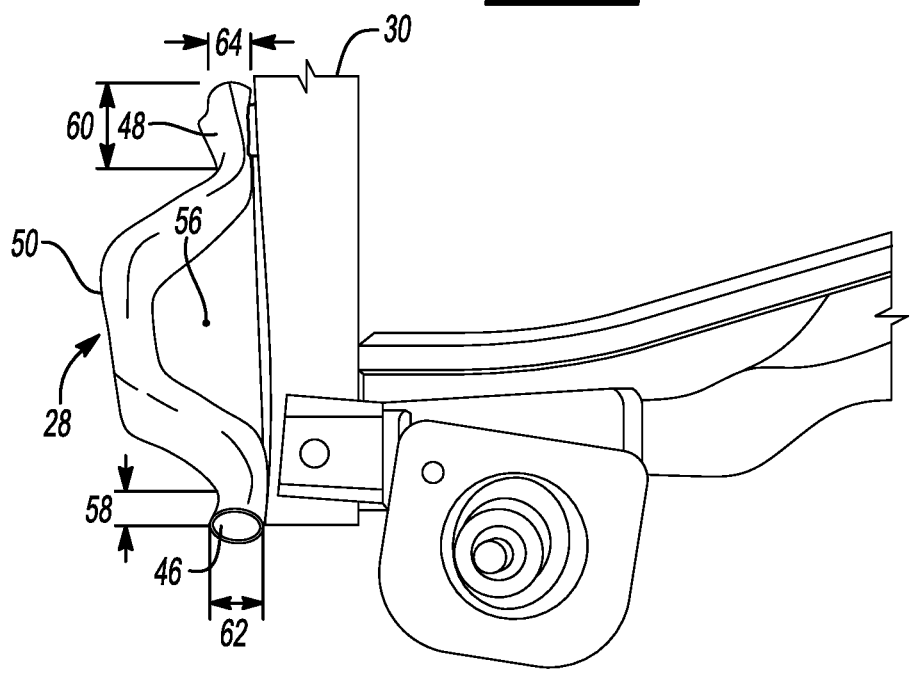
FIG. 4 is a top view of the bracket after an impact.

Referring to FIGS. 3 and 4, a top view of the sliding bracket 28 on the base 30 is depicted. FIG. 3 depicts the sliding bracket 28 before an impact and FIG. 4 depicts the sliding bracket 28 after an impact. The sliding bracket 28 is depicted in FIGS. 3 and 4 as being substantially parallel to or in line with the horizontal axis 44 of the base 30. As stated above, the sliding bracket 28 may also be disposed at an angle $\alpha$ relative to the horizontal axis 44 of the base 30 in other embodiments.

FIG. 3 depicts the sliding bracket 28 before deformation. As can be seen in FIG. 3, the platform 50 is spaced apart and parallel to the base 30 and connects the first tab 46 to the second tab 48. The platform 50 is spaced apart from the base 30 at a distance 52. The distance 52 between the platform 50 and the base 30 may vary depending on vehicle size, type, or any other parameter that requires an increased crush space for the subframe 16. Therefore, the distance 52 between the platform 50 and the base 30 may be optimized based upon the loading characteristics of an impact. The distance 52 allows the sliding bracket 28 to absorb energy in the event of an impact instead of transferring the energy through the subframe 16. As stated above, the distance 52 further allows the sliding bracket to increase the homogeneity and vehicle pulse index in the event of an impact. Further, the platform 50 also defines a length 54. The length 54 of the platform 50 may also aid the sliding bracket 28 to absorb energy in the event of an impact.

For example, to increase the area 56 between the platform 50 and the base 30, the length 54 of the platform 50 may be extended in a direction substantially parallel to the base 30. Likewise, in certain embodiments, the area 56 between the platform 50 and the base 30 may be decreased by reducing the length 54 of the platform 50 in a direction substantially parallel to the base 30. The area 56 further defines the available crush space for the sliding bracket 28 to absorb energy from an impact. The area 56 may be optimized based upon the required energy absorption of the sliding bracket 28 to prevent energy transfer through the subframe 16. The area 56 of the sliding bracket 28 further allows for a less rigid impact with the subframe 16. This further aids to increase homogeneity after impact, the vehicle pulse index during impact, as well as intrusion of the subframe 16.

FIG. 4 depicts the sliding bracket 28 after impact. After deformation of the sliding bracket 28, the platform 50 is loaded with a force being perpendicular to the base 30 and the first tab 46 is loaded with a force substantially parallel to the base 30. Loading of the platform 50 and the first tab 46 is aided by the fixed attachment of the second tab 48. The second tab 48 does not move when the base 30 of the subframe 16 is loaded due to the fixed attachment of the second tab 48 on the base 30. Therefore, energy from an impact may be transferred to the sliding bracket 28 through deformation of the platform 50 and first tab 46. Transferring energy through deformation of the platform 50 and the first tab 46 reduces the deformation on the subframe 16.

As stated above, the first tab 46 may be fixedly attached to the base 30 and the second tab 48 may be disposed freely on the base 30. In this scenario, in the event of an impact, the platform 50 deforms in a manner substantially perpendicular to the base 30 and the second tab 48 deforms in a manner substantially parallel to a horizontal axis 44 of the base 30. Again, energy is absorbed by the sliding bracket 28 through the deformation of the platform 50 and the second tab 48. The area 56 between the platform 50 and the base 30 is therefore reduced.

As can be seen in both FIGS. 3 and 4, the first and second tabs 46, 48 define a substantially circular cross-section. In at least one other embodiment, the first and second tabs 46, 48 may define a substantially rectangular cross-section, elliptical cross-section, trapezoidal cross-section, or any other cross-sectional area which allows the sliding bracket 28 to absorb energy. The dimensions of the first and second tabs 46, 48 may further aid to define energy absorption through the sliding bracket 28. The first and second tabs 46, 48 may define a first length 58 and second length 60, respectively. The first and second tabs 46, 48 may define a first width 62 and a second width 64, respectively. For example, the first length 58 of the first tab 46 may be greater than the second length 60 of the second tab 48, or vice versa. Likewise, the first width 62 of the first tab 46 may be greater than the second width 64 of the second tab 48, or vice versa. In at least one other embodiment, the first length 58 of the first tab 46 may be equal to the second length 60 of the second tab 48 and the first width 62 the first tab 46 may be equal to the second width 64 of the second tab 48.

The dimensions and geometry of the first and second tabs 46, 48 define the rigidity of the sliding bracket 28. Therefore, the cross-sectional area, length and width of the first and second tabs 46, 48 of the sliding bracket 28 may be optimized based upon the rigidity added to the base 30 and the impact characteristics. For example, to absorb more energy from an impact, the sliding bracket 28 may define first and second tabs 46, 48 to provide more rigidity to the base 30 such that more energy is required to deform the sliding bracket 28. Likewise, to absorb less energy from an impact, the sliding bracket 28 may define first and second tabs 46, 48 to provide less rigidity to the base 30 such that less energy is required to deform the sliding bracket 28. This allows the sliding bracket 28 to be optimized depending on the impact characteristics as well as the amount of energy absorbed by the sliding bracket 28.

Sliding bracket 28 may be composed of aluminum. In at least one other embodiment, the sliding bracket 28 may be composed of high-strength steel, carbon fiber, or any other material that allows the sliding bracket 28 to absorb energy in the event of an impact. As shown in FIGS. 3 and 4, the sliding bracket 28 is depicted as hollow. However, in at least one other embodiment, the sliding bracket 28 may define a single, extruded part.

While exemplary to embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle underbody structure comprising:
   a floor; and
   a subframe connected to the floor having a base extending a width of the subframe, the base including a bracket attached offset from a center and substantially adjacent a side of the base and defining a cylindrical cross-section, the bracket having first and second tabs, the second tab being bolted to the base, and the first tab being configured such that, upon impact, a platform connecting and extended from the first and second tabs is loaded substantially perpendicular to the base and the first tab is extended substantially parallel to the base.

2. The vehicle underbody structure of claim 1, wherein the bracket is further configured to be deformed such that homogeneity during loading occurs.

3. The vehicle underbody structure of claim 1, wherein the bracket is disposed at an angle relative to the base.

4. The vehicle underbody structure of claim 1, wherein the second tab is welded to the base of the subframe.

5. A vehicle comprising:
   a bumper;
   a floor; and
   a subframe attached to the floor at a plurality of attachment points and below the bumper, the subframe having a base member extending across the subframe, parallel to the bumper and including a bracket having first and second tabs connected by a platform extending from the first and second tabs, the bracket being fixedly attached at the second tab and angled relative to the base member such that the second tab is defined closer to the bumper and, upon loading, the first tab moves in a direction substantially parallel to the base member and the platform is deformed substantially perpendicular to the base member.

6. The vehicle of claim 5, wherein the platform of the bracket defines a length such that, upon impact, the bracket absorbs energy.

7. The vehicle of claim 5, wherein the bracket is angled relative to the base member.

8. The vehicle of claim 5, wherein the platform extends from the first and second tabs at a height to reduce energy transfer to the subframe.

9. The vehicle of claim 5, wherein the second tab defines a length greater than a length of the first tab.

10. The vehicle of claim 5, wherein the second tab defines a width greater than a width of the first tab.

11. A vehicle subframe comprising:
a base having a bracket attached at a first tab, the bracket being disposed offset a center of the base and includes a second tab and a platform that connects the tabs, defines a length greater than a length of the tabs, and is oriented such that upon loading, the platform is loaded perpendicular to the base and the first tab is loaded parallel to the base.

12. The subframe of claim 11, wherein the bracket defines a substantially circular cross-sectional area.

13. The subframe of claim 11, wherein the first tab defines a first length and the second tab defines a second length such that the first and second lengths are equal.

14. The subframe of claim 11, wherein the bracket is disposed substantially parallel to a horizontal axis of the base.

15. The subframe of claim 11, wherein the bracket is disposed such that the first tab is disposed on the base closer to a first edge of the base and the second tab is fixed to the base closer to a second edge of the base.

* * * * *